United States Patent
Kono et al.

(10) Patent No.: US 10,921,239 B2
(45) Date of Patent: Feb. 16, 2021

(54) ANALYSIS SYSTEM, ANALYSIS BYPASS, AND ANALYSIS METHOD

(71) Applicant: HITACHI, LTD., Tokyo (JP)

(72) Inventors: Shunsuke Kono, Tokyo (JP); Takuya Kambayashi, Tokyo (JP); Toshimitsu Noguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 205 days.

(21) Appl. No.: 16/208,464

(22) Filed: Dec. 3, 2018

(65) Prior Publication Data
US 2019/0302006 A1 Oct. 3, 2019

(30) Foreign Application Priority Data
Mar. 29, 2018 (JP) .............................. JP2018-064316

(51) Int. Cl.
*G01N 21/05* (2006.01)
*G01N 21/25* (2006.01)
*G01N 1/10* (2006.01)
*G01N 21/31* (2006.01)

(52) U.S. Cl.
CPC ................ *G01N 21/05* (2013.01); *G01N 1/10* (2013.01); *G01N 21/255* (2013.01); *G01N 21/31* (2013.01); *G01N 2021/052* (2013.01)

(58) Field of Classification Search
CPC .................................. G01N 21/05; G01N 1/10
See application file for complete search history.

(56) References Cited

U.S. PATENT DOCUMENTS

| | | | | |
|---|---|---|---|---|
| 4,671,309 A | * | 6/1987 | Iemura | G03G 15/105 118/691 |
| 5,346,466 A | * | 9/1994 | Yerlikaya | A61M 5/1689 128/DIG. 13 |
| 5,982,847 A | * | 11/1999 | Nelson | G01N 33/2858 378/45 |
| 6,471,136 B1 | * | 10/2002 | Chatterjee | F25D 17/042 237/2 B |
| 6,659,634 B2 | * | 12/2003 | Hiraoka | B24B 37/04 137/3 |
| 10,101,308 B2 | * | 10/2018 | Fujiwara | G01N 21/4133 |
| 10,352,865 B1 | * | 7/2019 | Yelvington | G01N 21/47 |
| 10,472,253 B2 | * | 11/2019 | Fujita | C02F 1/32 |

FOREIGN PATENT DOCUMENTS

JP 2014209063 A 11/2014

* cited by examiner

*Primary Examiner* — Maurice C Smith
(74) *Attorney, Agent, or Firm* — Procopio, Cory, Hargreaves & Savitch LLP (57) ABSTRACT

An analysis system is provided which enables an optical analysis with high accuracy.

An analysis system A in which light is radiated on a liquid sample to analyze the sample includes a reaction part 1 which includes a reaction tank 12, an inlet port 14, and an outlet port 16, an analysis part 2 which includes an analysis cell 22*a*, at least one light source part 24, and at least one light receiving part 26, and a flow path tube 3 which includes a first flow path 32 and a second flow path 34. A measurement part 222 of the analysis cell 22*a* includes a first measurement portion 2221 and a second measurement portion 2222, which have mutually different sectional areas.

11 Claims, 6 Drawing Sheets

(a) $8.4 \times 10^7$ PIECES/mL

[FIG. 5]

(b) $16.8 \times 10^7$ PIECES/mL

ANALYSIS SYSTEM, ANALYSIS BYPASS, AND ANALYSIS METHOD

TECHNICAL FIELD

The present invention relates to an analysis system, an analysis bypass, and an analysis method.

BACKGROUND ART

In the related art, there is known a method in which light is radiated on a liquid sample to analyze components included in the sample. For example, PTL 1 describes "a spectrometer capable of providing a flow cell without cutting a sample flow path, and arbitrarily changing an optical path length of the flow cell by deforming a flexible tube".

CITATION LIST

Patent Literature

PTL 1: JP-A-2014-209063

SUMMARY OF INVENTION

Technical Problem

The liquid environment (for example, temperature) in a flow path tube such as the above-described flexible tube is different from the environment of a reaction tank. When an optical analysis is continuously performed on the liquid sample while a predetermined reaction proceeds in the reaction tank, it is preferable that the optical analysis is performed early on the sample fed from the reaction tank since the change of the components is small. In addition, when the liquid sample which completed the optical analysis is returned to the reaction tank, it is preferable that the analyzed sample is fed early to the reaction tank in view of avoiding the component change due to the analysis of the sample in the reaction tank. However, in the technology disclosed in PTL 1, the sectional area is reduced due to the deformation of the flexible tube. Accordingly, due to the above-described reason, when the feeding rate to the flexible tube increases, the flow rate of the sample at the portion in the flexible tube where light is radiated to perform an analysis is higher than the feeding rate. As a result, the accuracy of the optical analysis decreases.

In this regard, an object of the invention is to provide an analysis system, an analysis bypass, and an analysis method capable of an optical analysis with high accuracy.

Solution to Problem

This application includes a plurality of tools for solving at least part of the above-described problems, and an example of the plurality of tools is as follows.

In a first aspect according to the invention, provided is an analysis system in which light is radiated on a liquid sample to analyze the sample. The analysis system includes: a reaction part which includes a reaction tank for accommodating the sample, an inlet port for flowing the sample into the reaction tank, and an outlet port for flowing out the sample from the reaction tank; an analysis part which includes an analysis cell for analyzing the sample, at least one light source part for radiating light on the analysis cell, and at least one light receiving part for receiving transmitted light or scattered light of the sample; and a flow path tube which includes a first flow path for feeding the sample from the outlet port of the reaction tank to the analysis cell, and a second flow path for feeding the sample from the analysis cell to the inlet port of the reaction tank.

The analysis cell includes a measurement part where the light from the light source part is radiated on the sample, a supply port where the sample is supplied from the first flow path to the measurement part, and a discharge port where the sample is discharged from the measurement part to the second flow path. The measurement part includes a first measurement portion and the second measurement portion, which have mutually different sectional areas.

In a second aspect according to the invention, an analysis bypass includes: an analysis part which includes an analysis cell for analyzing a liquid sample; and a flow path tube which includes a first flow path for feeding the sample to the analysis cell and a second flow path for feeding the sample to the outside from the analysis cell.

The analysis cell includes a first measurement portion and a second measurement portion, which have mutually different sectional areas.

In a third aspect according to the invention, provided is an analysis method in which light is radiated on a liquid sample to analyze the sample. The analysis method includes:

(1) a step of flowing the liquid sample accommodated in a container to an analysis cell connected to the container; and (2) a step of radiating light on the sample present in the analysis cell to analyze the sample.

The analysis cell includes a supply port where the sample is supplied from a first flow path, a measurement part where light radiated from a light source part passes through the sample, and a discharge port where the sample is discharged from the measurement part to a second flow path. The measurement part includes a first measurement portion and a second measurement portion which has a sectional area different from the sectional area of the first measurement portion.

Advantageous Effects of Invention

According to the invention, the analysis system capable of the optical analysis with high accuracy can be provided.

The problems, configurations, and effects other than those described above will become apparent from the following description of embodiments.

DESCRIPTION OF EMBODIMENTS

Hereinafter, embodiments for carrying out the invention (hereinafter, simply referred to as "this embodiment") are described in detail. The following embodiment is presented as an example for describing the invention, and the invention is not intended to be limited to the following contents only. In addition, the following embodiment is described with a plurality of embodiments as needed for convenience. However, unless otherwise particularly specified, the plurality of embodiments are not irrelevant to one another but rather in a relation of one being a modification, a detailed description, a supplemental description, and the like of parts or all of another one.

In addition, when the number or the like of the components (including a number, a numerical value, an amount, a range, and the like) is mentioned in the following embodiment, the number is not limited to a particular number but rather may be a number more than or less than the particular number, unless otherwise particularly specified or principally apparent that the number is limited to the particular number. Further, the components (including element steps and the like) in the following embodiment are not necessarily essential, unless otherwise particularly specified or principally apparent to be essential.

Likewise, when a shape, a positional relationship, or the like of the components or the like is mentioned in the following embodiment, it is assumed that the shape or the like includes a shape substantially approximate or similar thereto, unless otherwise particularly specified or apparently not conceivable in principle. The same applies to the above-described numerical value and the range.

Further, in all the drawings for describing the embodiment, the same members are denoted in principle by the same reference numerals, and the description thereof is not repeated. In addition, some plan views may be hatched to make the drawings easy to see. Further, in some descriptions, an orthogonal coordinate system of an X axis, a Y axis, and a Z axis is used to assist understanding. However, unless otherwise specified, the X axis and the Y axis are set to configure a horizontal plane, and the Z axis is set to be a direction vertical to the horizontal plane. Further, although not matching the axes strictly, a modification is allowed and included within the scope where the substantially same operational effect can be achieved.

<Analysis System>

A first aspect of this embodiment is an analysis system.

Figure 1:
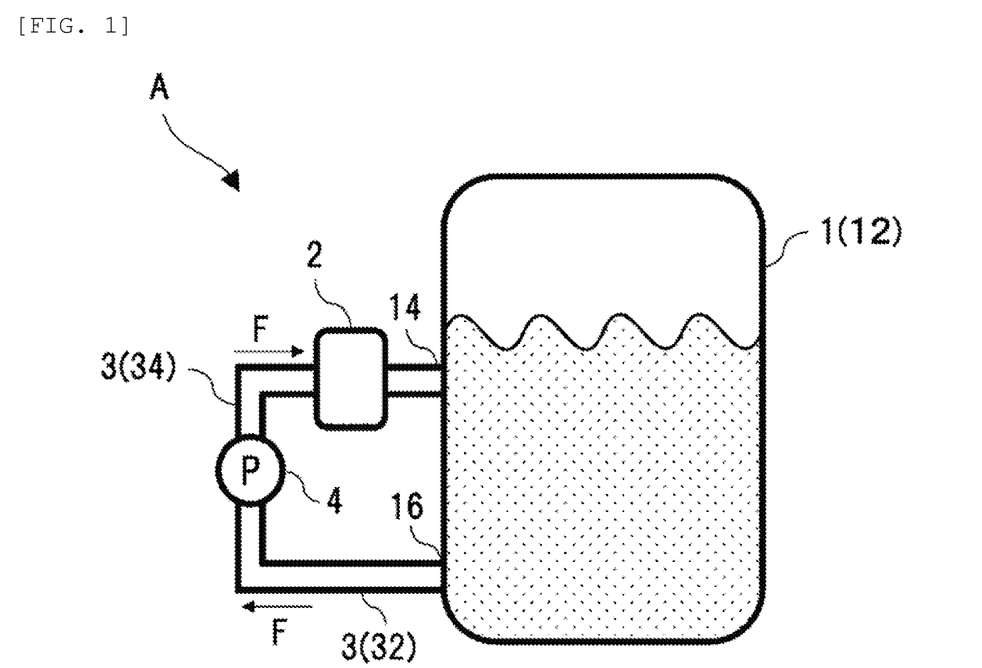
FIG. 1 is a diagram illustrating one example of an analysis system according to this embodiment.
Figure 2:
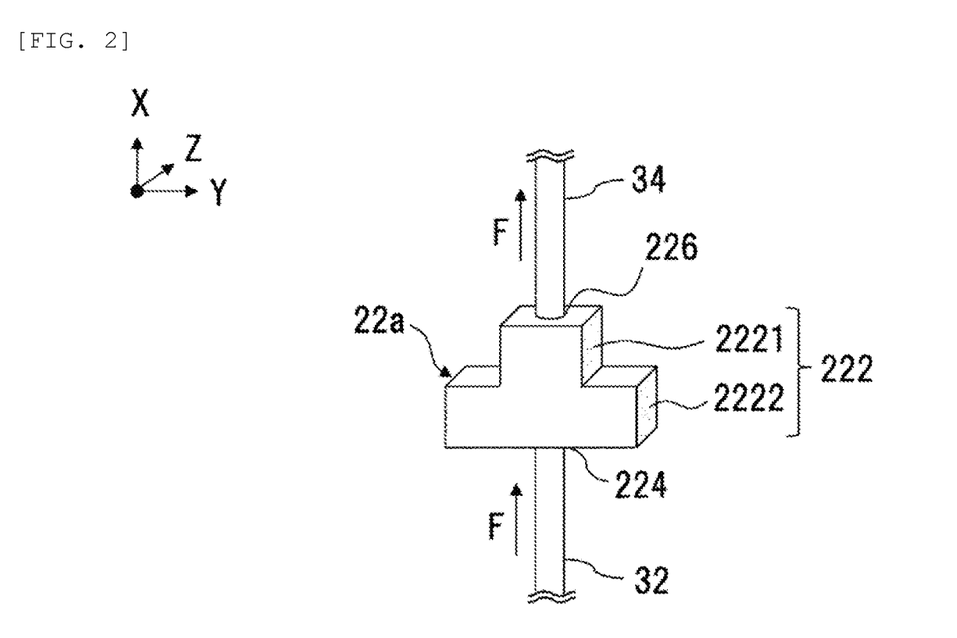
FIG. 2 is a diagram illustrating one example of an analysis cell in this embodiment.
Figure 3:
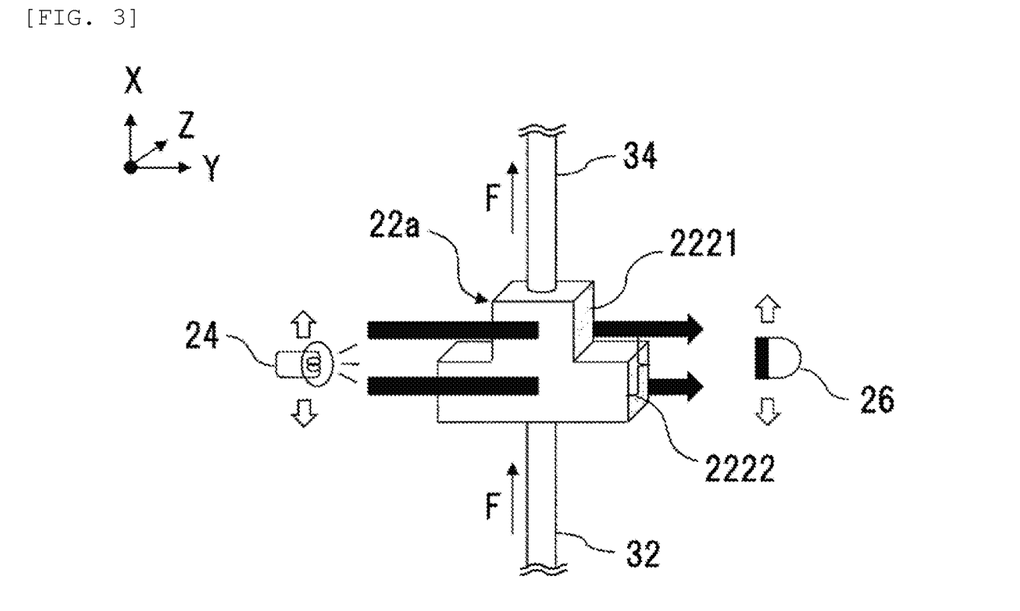
FIG. 3 is a diagram illustrating one example of an optical system in this embodiment.

FIG. 1 is one example of the analysis system according to this embodiment. FIG. 2 is a diagram illustrating one example of an analysis cell in FIG. 1. FIG. 3 is a diagram illustrating one example of an optical system in this embodiment.

An analysis system A is an analysis system in which light is radiated on a liquid sample to analyze the sample. The analysis system A includes a reaction part 1 which includes a reaction tank 12 for accommodating a sample, an inlet port 14 for flowing the sample into the reaction tank 12, and an outlet port 16 for flowing out the sample from the reaction tank 12, an analysis part 2 which includes an analysis cell 22a for analyzing the sample, at least one light source part 24 for radiating light on the analysis cell 22a, and at least one light receiving part 26 for receiving the transmitted light or the scattered light of the sample, and a flow path tube 3 which includes a first flow path 32 for feeding the sample from the outlet port 16 of the reaction tank 12 to the analysis cell 22a, and a second flow path 34 for feeding the sample from the analysis cell 22a to the inlet port 14 of the reaction tank 12. The analysis cell 22a includes a measurement part 222 where the light from the light source part 24 is radiated on the sample, a supply port 224 where the sample is supplied from the first flow path 32 to the measurement part 222, and a discharge port 226 where the sample is discharged from the measurement part 222 to the second flow path 34. The measurement part 222 includes a first measurement portion 2221 and a second measurement portion 2222, which have mutually different sectional areas.

The sample in the reaction tank 12 circulates in the system by a pump 4. The sample is fed from the outlet port 16 of the reaction tank 12, through the first flow path 32, to the analysis cell 22a of the analysis part, and a spectroscopic analysis is performed. Then, the sample is fed, through the second flow path 34, from the inlet port 14 to the reaction tank 12. The analysis system A can perform the analysis continuously without stopping the reaction of the reaction tank 12 or the feeding of the sample. For example, in the reaction tank 12, a biological, chemical, or physical reaction is performed, and the reaction solution (liquid sample) thereof can be measured in the analysis cell 22a. Further, the optical analysis can be continuously performed on the reaction solution in the analysis cell 22a while a predetermined reaction proceeds in the reaction tank 12. Further, the temporal change thereof can be observed.

The analysis system A can perform a nondestructive analysis of the sample so that the sample can be reused. For example, when the analysis system is operated with a large scale for a long time, the quantity of measured sample becomes large, and thus there is a large economical advantage in that the sample can be reused.

As long as the sample is a liquid phase, the kind thereof is not limited. For example, the liquid may be a solution in which a solute and a solvent are mixed homogenously, a suspension in which solid particles are dispersed in a solvent, an emulsion containing oil droplets and the like, a colloidal liquid, and the like. Further, the components constituting the liquid sample may be a plurality of components. If the sample has a plurality of components, it is sufficient that at least one component is a liquid phase. For example, the combination may be made by liquid phase-liquid phase, liquid phase-solid phase, liquid phase-gas phase, liquid phase-solid phase-gas phase, or the like. In addition, the viscosity of the sample may have such a fluidity that enables the feeding, and is not limited particularly.

For example, specific examples of the sample include a culture solution of cells, microorganisms, fungi, or the like which performs a biological reaction, various chemicals which perform a chemical reaction, a solvent, or the like. Among the above, a culture solution of cells, microorganisms, fungi, or the like which performs a biological reaction is preferable.

The kind of the optical analysis performed in the analysis cell 22a is not limited particularly. Examples of the optical analysis include an infrared spectroscopic analysis, a near infrared spectroscopic analysis, an ultraviolet/visible spectroscopic analysis, a fluorescence spectroscopic analysis, a phosphorescence spectroscopic analysis, an X-ray analysis, or the like. In addition, the examples include various absorption spectroscopic analyses in which light is radiated on the sample to measure the intensity of the transmitted light, various light-scattering spectroscopic analyses in which light is radiated on the sample to measure the intensity of the scattered light, and various photoelectron spectroscopic analyses in which light is radiated on the sample to measure the energy of the released photoelectrons.

For example, the transmitted light or the scattered light (including the reflected light in this specification unless otherwise noted) mentioned in this embodiment includes light which is a measurement target in the above-described various spectroscopic analyses.

In the light source part 24 and the light receiving part 26, a preferable configuration may be adopted as appropriate according to the kind of the used spectroscopic analysis, the measurement conditions, or the like. As the light source part 24, for example, a device capable of radiating infrared light, near infrared light, ultraviolet light, visible light, excitation light, X-ray, and the like can be used. As the light receiving part 26, for example, a detector capable of detecting the light to be measured can be used. Specific examples of the light receiving part 26 include, for example, a device which is equipped with an InGaAs photodiode, an InSb photoconductive element, a PbS photoconductive element, a photomultiplier tube, a Si photodiode, or the like.

The optical system of the analysis system A may perform a light radiation on the analysis cell 22a from the light source part 24 and may perform an analysis in the light receiving part 26. As needed, a plurality of light source parts 24, and a plurality of light receiving parts 26 may be provided, and the light source part 24 or the light receiving part 26 may be movable and variable.

The light source part 24 and the light receiving part 26 are movable separately (see FIG. 3). By moving a pair of light source part 24 and light receiving part 26, the light can be selectively radiated on the first measurement portion 2221 or the second measurement portion 2222, and the light can be received. In addition, for example, the light radiation is not limited to a so-called spot radiation, and the spot may be scanned in each of the measurement portions.

Although not illustrated, preferably, the analysis part 2 further includes a position change mechanism which changes the radiation spot of the light within the first measurement portion 2221 or the second measurement portion 2222. The configuration of the position change mechanism is not limited particularly, as long as the light is capable of being radiated toward a target radiation position within the first measurement portion 2221 or within the second measurement portion 2222. The position change mechanism is provided so that the light can be more accurately radiated in a target position.

There is a tendency that the quantity of the absorbed light is varied depending on the concentration of the components contained in the sample. By using the tendency, the component concentration in the sample can be obtained by performing the optical analysis in which the optical path length is fixed (flat). In addition, there is a tendency that the intensity of the light which is received by the light receiving part 26 is varied depending on the number of the scatterers present on an optical path. By using the tendency, the concentration of the scatterer in the sample can be measured in the optical analysis. Meanwhile, when the number of the scatterers on the optical path is excessively large, the intensity of the received light of the light receiving part 26 is excessively weak, and when the number of the scatterers on the optical path is excessively small, the intensity of the received light of the light receiving part 26 changes less. Thus, in the scatterer concentration measurement, it is important to adjust the number of the scatterers on the optical path. Accordingly, in this embodiment, various kinds of information on the sample can be obtained by performing the optical analysis at the measurement portion where the optical path length is constant, and the optical analysis at the measurement portion where the optical path length changes.

Preferably, the first measurement portion 2221 and the second measurement portion 2222 have the portions in which the optical path lengths of the light radiated by the light source part 24 are equal to each other, and the portions in which the optical path lengths of the light radiated by the light source part 24 are different from each other. In a Y-axis direction (that is, the right and left direction of the paper surface) perpendicular to an X-axis direction which is the flow direction (see arrow F) of the sample, the optical path length of the first measurement portion 2221 is different from the optical path length of the second measurement portion 2222. Further, in a Z-axis direction which is perpendicular to the plane including the X-axis direction and the Y-axis direction, the optical path length of the first measurement portion 2221 is equal to the optical path length of the second measurement portion 2222.

A multidimensional spectroscopic analysis can be performed in such a manner that first, the number or the shape of particles is measured in the optical system where the optical path length changes, and subsequently, a place proper for the measurement is decided in the optical system where the optical path length is constant (flat), to measure the concentration or the like of the components at the place. For example, when the analysis cell 22a is used, the number, the shape, or the like of particles in the Y-axis direction can be measured optically, and the component concentration of the particles in the Z-axis direction can be measured optically. When the multidimensional analysis is performed, it is possible to divide the usage such that the component concentration of the sample is measured in the portion of the analysis cell 22a having the equal optical path length of the light, and the concentration of the scatterer of the sample is measured in the portion having the different optical path length of the light.

The analysis cell 22a includes the measurement part 222 where the light from the light source part 24 is radiated on the sample, the supply port 224 where the sample is supplied from the first flow path 32 to the measurement part 222, and the discharge port 226 where the sample is discharged from the measurement part 222 to the second flow path 34 (see FIG. 2). The measurement part 222 includes the first measurement portion 2221 and the second measurement portion 2222, which have mutually different sectional areas. The analysis cell 22a is hollow such that the sample can flow therein. Herein, the sectional area means a sectional area of the inner space, which is filled with the sample, of each of the measurement portions in a surface perpendicular to the flow direction (see arrow F) of the sample.

The material of the analysis cell 22a is not limited particularly as long as the material can be used in the spectrometry. Preferably, the material of the analysis cell 22a is excellent in thermal resistance, pressure resistance, and mechanical strength, is easy to clean and sterilize, and is stable with respect to the sample. For example, the preferable material of the analysis cell 22a is quartz glass, an organic substance, or the like.

The material of the flow path tube 3 is not limited particularly. However, preferably, the material is excellent in thermal resistance, pressure resistance, and mechanical strength, is easy to clean and sterilize, and is stable with respect to the sample.

The analysis cell 22a has the first measurement portion 2221 and the second measurement portion 2222, which have mutually different sectional areas, and any one measurement portion proper to measure the sample can be selected. The first measurement portion 2221 and the second measurement portion 2222 have the equal optical path length but have the different sectional areas. Therefore, it is possible to reduce a lowering of the analytical accuracy due to the change of the flow rate of the sample or the concentration, and to perform the optical analysis with high accuracy.

(Inspection or the Like of Analytical Accuracy in Analysis Cell)

Normally, there is a problem that the analytical accuracy of the sample fed into the flow path tube 3 or the analysis cell 22a is changed depending on the flow rate of the sample in the measurement portion on which the light is radiated from the light source part 24. The relation (flow rate dependence) between the flow rate of the sample and the analytical accuracy is checked in order to inspect the problem in detail.

As for the flow rate dependence, the determination coefficient ($R^2$ (validation)) of the measuring model is evaluated when the liquid sample is fed to a measurement region (analysis cell) having the sectional area of 3 mm$^2$, and a near-infrared-light spectroscopic analysis is performed in the measurement region. The determination coefficient is one (correlation between a predictive value and a true value) of the index values indicating the accuracy of the measuring model. Normally, the determination coefficient is a value of 0 or more and 1 or less. When the determination coefficient is 0.85 or more, it is evaluated that the accuracy of the measuring model is excellent.

The liquid sample used in the inspection is prepared by using pure water as a solvent, glucose (concentration: 0 to 100 mM) as a solute, and polystyrene particles (particle size of 3 μm) as a scatterer. The concentration of polystyrene particles is set to each of the case of (a) 8.4×10$^7$ particles/mL and the case of (b) 16.8×10$^7$ particles/mL to perform the inspection.

Figure 4:
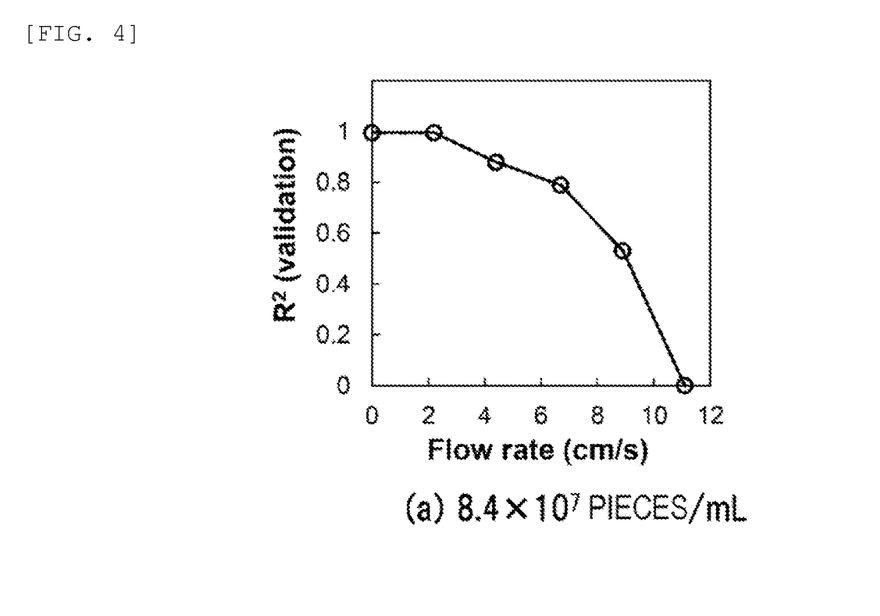
FIG. 4 is a graph illustrating a relationship between a flow rate of a sample (a) and an analytical accuracy.
Figure 5:
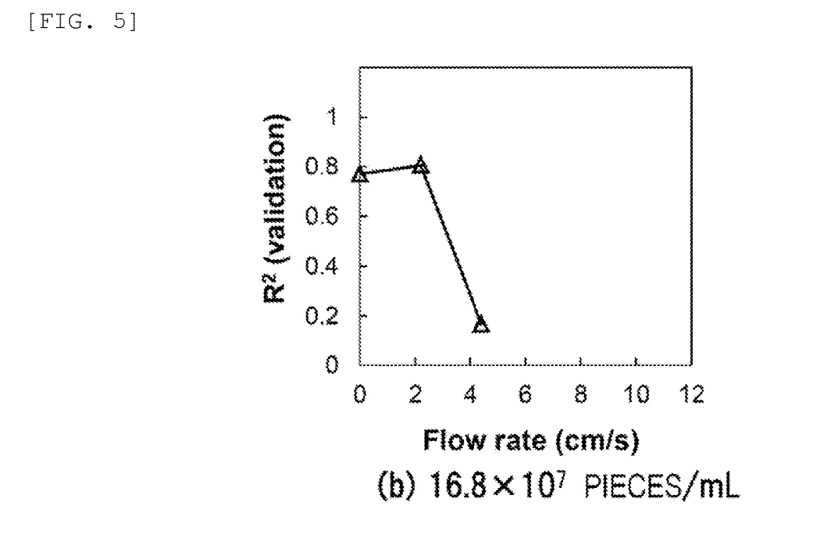
FIG. 5 is a graph illustrating a relationship between a flow rate of a sample (b) and the analytical accuracy.

FIG. 4 is a graph illustrating a relationship between a flow rate of the sample (a) and the analytical accuracy. FIG. 5 is a graph illustrating a relationship between a flow rate of the sample (b) and the analytical accuracy.

From FIG. 4, it is at least confirmed that in the sample (a), the analytical accuracy is lowered according to the increase of the flow rate. On the other hand, from FIG. 5, it is at least confirmed that in the sample (b), the analytical accuracy is most excellent when the flow rate is 2 cm/s. That is, when the flow rate is excessively slow, there is a strong tendency that the analytical accuracy is lowered due to adhesion of dirt on the analysis cell 22a or the like. In addition, when the flow rate is excessively fast, there is a strong tendency that the quantity of the light (including transmitted light or scattered light) passing through the sample is not stable, and the analytical accuracy is lowered. Therefore, it is confirmed that it is important to perform the optical analysis at least at a proper flow rate in order to perform the optical analysis with high accuracy (however, the effect of this embodiment is not limited thereto).

In such a point, the analysis cell 22a of this embodiment has a structure in which the sectional area of the first measurement portion 2221 is different from that of the second measurement portion 2222. Thus, the flow rate of the sample flowing in the first measurement portion 2221 is different from the flow rate of the sample flowing in the second measurement portion 2222. Accordingly, the analysis can be performed with high analytical accuracy by selecting the measurement portion of the flow rate proper for the optical analysis to be performed between the first measurement portion 2221 and the second measurement portion 2222.

In the analysis system A, when the analysis cell 22a having such a structure is used, it is possible to reduce a lowering of the analytical accuracy due to the flow rate or the concentration of the sample in the flow path tube 3, and to perform the optical analysis with high accuracy. Particularly, the effect is prominent when the sample includes the scatterer, and it is possible to more effectively reduce a lowering of the analytical accuracy according to the increase of the flow rate or the concentration of the scatterer. When the sample includes the scatterer, the effect of the increase of the flow rate or the concentration becomes larger. However, according to this embodiment, the analysis can be performed with high accuracy although the liquid sample includes the scatterer.

(Modification of Optical System)

In the optical system in the analysis system A, a preferable configuration can be adopted as appropriate in consideration of the analysis target, the analysis condition, or the like. For example, a following preferable modification can be adopted with respect to the light source part 24 or the light receiving part 26.

Figure 6:
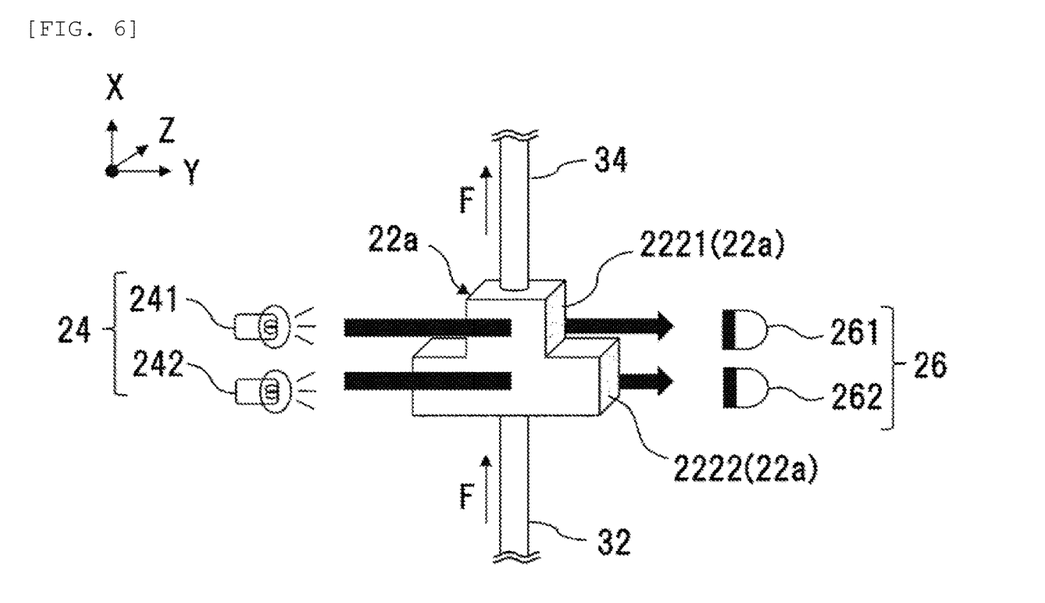
FIG. 6 is a diagram illustrating another example of the optical system in this embodiment.

FIG. 6 is a diagram illustrating a configuration of another example of the optical system in this embodiment.

The light source part 24 includes a first light source part 241 which radiates first light on the sample of the first measurement portion 2221, and a second light source part 242 which radiates second light on the sample of the second measurement portion 2222. Further, the light receiving part 26 includes a first light receiving part 261 which receives the transmitted light or the scattered light of the sample of the first measurement portion 2221, and a second light receiving part 262 which receives the transmitted light or the scattered light of the sample of the second measurement portion 2222.

Herein, the configuration having two pairs of the light source part 24 (the first light source part 241 and the second light source part 242) and the light receiving part 26 (the first light receiving part 261 and the second light receiving part 262) is described as an example. However, a configuration having three or more pairs of the light source part 24 and the light receiving part 26 may be adopted. Similarly to the case of the configuration having two pairs of the light source part 24 and the light receiving part 26, in the case having three or more pairs of the light source part 24 and the light receiving part 26, the light source part and the light receiving part are not necessarily arranged in parallel. In addition, the light source part 24, the measurement part 222, and the light receiving part 26 are not necessarily arranged on a straight line in this order. For example, as needed, such an optical system may be configured by a mirror or the like.

Although not illustrated, preferably, the analysis part 2 further includes a control part which controls the light radiation condition (for example, radiation position, radiation strength, radiation time, or the like) of the second light source part 242 based on the analysis result obtained by the first light receiving part 261. By such a configuration, the result of the first optical analysis which uses the first light radiated from the first light source part 241 can be reflected to the second optical analysis which uses the second light radiated from the second light source part 242. Thus, the analytical accuracy can be further improved.

A multidimensional analysis can be performed by performing different kinds of the spectroscopic analyses in the first measurement portion 2221 and the second measurement portion 2222. For example, the concentration of the components of the sample (the concentration of the components dissolved in the sample) can be measured in the first measurement portion 2221, and the concentration of the scatterer of the sample can be measured in the second measurement portion 2222. At that time, for example, in the first measurement portion 2221 and the second measurement portion 2222, the measurement places may be selected such that the optical path lengths are constant (flat), and the measurement places may be selected such that the optical path lengths are different from each other.

Figure 7:
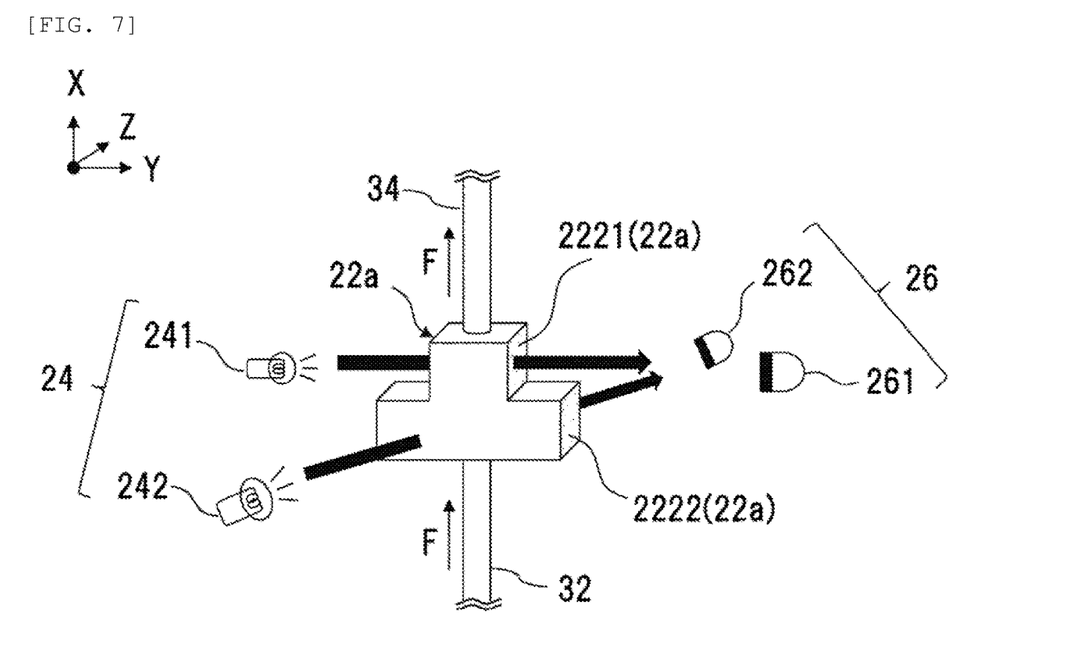
FIG. 7 is a diagram illustrating still another example of the optical system in this embodiment.

FIG. 7 is a diagram illustrating a configuration of still another example of the optical system in this embodiment.

Preferably, the light source part 24 is arranged such that the optical path of the light radiated to the first measurement portion 2221 and the optical path of the light radiated to the second measurement portion 2222 are in a twisted position. Herein, the twisted position is such a positional relation that both optical paths are not in parallel and are not intersected. The optical system of the first measurement portion 2221 (the first light source part 241 and the first light receiving part 261) and the optical system of the second measurement portion 2222 (the second light source part 242 and the second light receiving part 262) are in the twisted position, which contribute to save the space of the device.

Preferably, the sectional area of the light radiated from the light source part 24 is smaller than any one of the surface area of the radiation region of the first measurement portion 2221 and the surface area of the radiation region of the second measurement portion 2222. For example, the surface area of the radiation region of the first measurement portion 2221 means the area of the region, where the light from the light source part 24 can be radiated to the first measurement portion 2221, in the first measurement portion 2221. Therefore, the accuracy of the optical analysis can be further improved.

(Modification of Analysis Cell)

The analysis cell according to this embodiment may have two or more of measurement portions having different sectional areas, and is not limited to the above-described shape. For example, although not illustrated, the measurement portions in the analysis cell are not necessarily adjacent to each other, and may have a structure that the measurement portions are connected through a connection part or the like. Further, for example, a following modification can be adopted as a structure in which a proper measurement portion can be selected from a plurality of measurement portions according to the flow rate of the sample.

Figure 8:
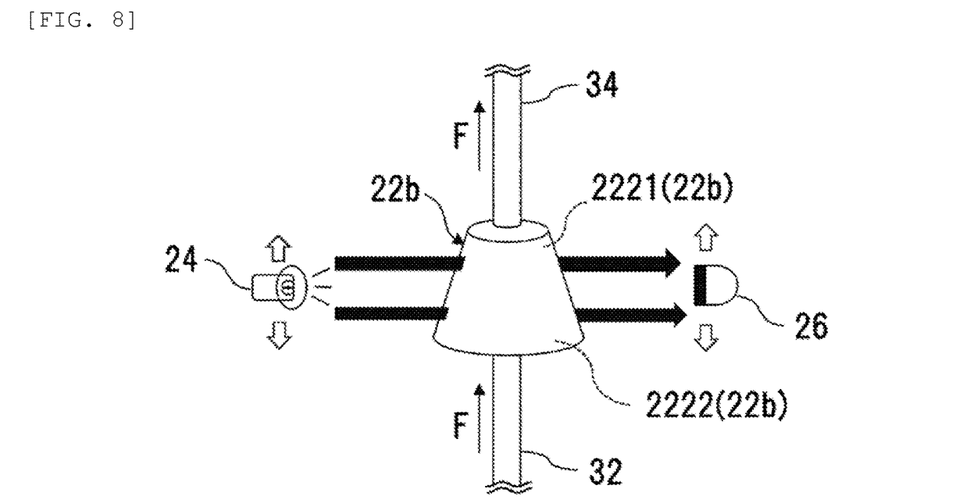
FIG. 8 is a diagram illustrating another example of the analysis cell in this embodiment.

FIG. 8 is a diagram illustrating a configuration of another example of the analysis cell in this embodiment.

A preferred example of the analysis cell is exemplified by an analysis cell 22b which includes the first measurement portion 2221 and the second measurement portion 2222 adjacent to each other, and has a substantially truncated cone shape. The side surface of the analysis cell 22b is a tilted surface, and thus respective sectional areas of the first measurement portion 2221 and the second measurement portion 2222 can be made variable steplessly. Therefore, it is possible to improve the range of selection (selectability) of the flow rate which is proper for the optical analysis, and to further improve the analytical accuracy.

Additionally, in the analysis cell 22b, respective optical path lengths of the first measurement portion 2221 and the second measurement portion 2222 also can be made variable steplessly. Therefore, it is possible to improve the range of selection (selectability) of the optical path length which is proper for the spectrometry, and to further improve the analytical accuracy from such a view.

Additionally, in the analysis cell 22b, the number of the measurement places is not limited to two, and may be configured arbitrarily. Therefore, it is possible to improve the range of selection (selectability) of the measurement place where the spectrometry is performed, and to further improve the analytical accuracy from such a view point.

Figure 9:
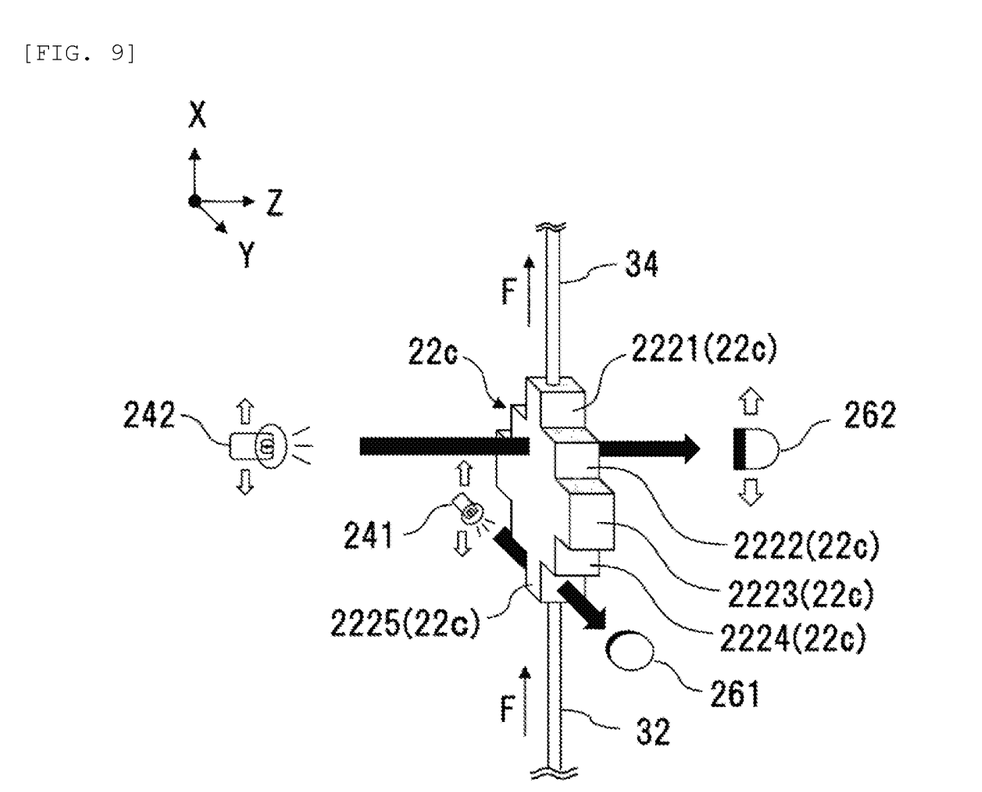
FIG. 9 is a diagram illustrating still another example of the analysis cell in this embodiment.

FIG. 9 is a diagram illustrating a configuration of still another example of the analysis cell in this embodiment.

When the flow direction of the sample is set as an X-axis direction, the direction substantially perpendicular to the flow direction is set as the Y-axis direction, and the direction perpendicular to the plane including the X-axis direction and the Y-axis direction is set as the Z-axis direction, an analysis cell 22c has at least the first measurement portion 2221, the second measurement portion 2222, a third measurement portion 2223, a fourth measurement portion 2224, and a fifth measurement portion 2225 along the X-axis direction in this order. Further, respective sectional areas of the first to third measurement portions are different from each other, and respective sectional areas of the third to fifth measurement portions are different from each other. Further, all the lengths of the first to fifth measurement portions in the Z-axis direction are almost equal. Further, the length in the Y-axis direction satisfies a relation expressed by following formula (i) and a relation expressed by following formula (ii).

the length of the third measurement portion 2223 in the Y-axis direction>the length of the second measurement portion 2222 in the Y-axis direction>the length of the first measurement portion 2221 in the Y-axis direction (i)

the length of the third measurement portion 2223 in the Y-axis direction>the length of the fourth measurement portion 2224 in the Y-axis direction>the length of the fifth measurement portion 2225 in the Y-axis direction (ii)

The analysis cell 22c has the first to fifth measurement portions, and has a structure in which the sectional areas of three adjacent measurement portions (the first to third measurement portions and the third to fifth measurement portions) are different from each other. The sample can be measured at a more proper flow rate as the number of the measurement portions having different sectional areas is larger. Thus, the accuracy of the optical analysis can be further improved.

Further, by using the analysis cell 22c, it is possible to continuously perform more multidimensional spectroscopic analysis with high accuracy. For example, it is possible to perform the first optical analysis on the optical path along the Y-axis direction and to perform the second optical analysis on the optical path along the Y-axis direction. For example, the first optical analysis is performed by using the first light source part 241 and the first light receiving part 261, and the second optical analysis is performed by using the second light source part 242 and the second light receiving part 262. At this time, the first optical analysis and the second optical analysis may be configured to perform the analysis separately. Further, a configuration may be made in which the measurement condition of the second optical analysis is decided based on the analysis result of the first optical analysis to perform the second optical analysis. By reflecting one optical analysis result on the condition setting of the other optical analysis, it is possible to further improve the analytical accuracy.

In the first optical analysis (Y-axis direction), since the optical path lengths of the respective measurement portions are different, it is possible to select the measurement portion having the optical path length proper for the analysis by five stages.

In the second optical analysis (Z-axis direction), the optical path lengths of the respective measurement portions are equal. However, the flow rates of the sample are different in the upstream portion and in the downstream portion. That is, the measurement place of the flow rate proper for the analysis can be selected steplessly along the flow direction (X-axis direction), and the light is radiated along the Z-axis direction.

When the first optical analysis is performed, if the optical path length is excessively short, the transmitted light or the scattered light cannot be sufficiently obtained, thereby lowering the analytical accuracy. On the other hand, there is a problem that when the optical path length is excessively long, the light cannot be sufficiently transmitted through the sample, thereby lowering the analytical accuracy.

At that point, according to this embodiment, in the first optical analysis, a measurement portion of the proper optical path length or flow rate is selected among the five measurement portions having different optical path lengths, and the optical analysis can be performed on the measurement portion. Thus, such a problem can be solved. Further, in the second optical analysis, the component concentration of the sample on the downstream tends to be higher than the component concentration of the sample on the upstream. However, in this embodiment, a measurement portion of the proper flow rate is selected in consideration of such a tendency, and the optical analysis can be performed at the portion. Thus, it is possible to further perform the optical analysis.

As described above, when the analysis cell 22c is used, it is possible to perform the multidimensional analysis and to perform the analyses with high accuracy. Additionally, a pair of the light source part 241 and the light receiving part 261 do not interfere spatially with another pair of the light source part 242 and the light receiving part 262, which contribute to save the space of the device.

In one example of performing the multidimensional analysis, the number and shape of the particles in the sample, the distance between the particles, and the like are measured by the first optical analysis, and, based on the measurement result thereof, the component analysis of the component concentration and the like of the sample can be performed by the second optical analysis. Specifically, first, the number, the shape, or the like of the scatterers in the sample in the optical system where the optical path length changes is measured by the first optical analysis, and subsequently, based on the result of the first optical analysis, an optimal place for measurement in the optical system in which the optical path length is constant (flat) is decided to measure the component concentration or the like in the place.

The above-described configuration is an example. The side surface where the optical path length changes may be configured to be plural, or the side surface where the optical path length does not change may be configured to be plural. When the measurements where the optical path length is different can be performed, the optical path length can be optimized as well as the flow rate. Thus, it is possible to further improve the analytical accuracy.

<Analysis Bypass>

A second aspect of this embodiment is an analysis bypass.

The analysis bypass according to this embodiment includes an analysis part 2 having the above-described analysis cell 22 (22a, 22b, and 22c), a first flow path 32 for feeding the sample to the analysis cell 22, and a second flow path 34 for feeding the sample to the outside from the analysis cell 22. The analysis bypass according to this embodiment can be used as one component configuring the above-described analysis system. Unless otherwise noted, the portion described in the above-described analysis system can be used as the portion configuring the analysis bypass according to this embodiment.

One of the preferred examples of the analysis bypass includes the analysis part which has the analysis cell 22 for analyzing the liquid sample, and the flow path tube 3 which includes the first flow path 32 for feeding the sample to the analysis cell 22, and the second flow path 34 for feeding the sample to the outside from the analysis cell 22. The analysis cell 22 is an analysis bypass which has the first measurement portion 2221 and the second measurement portion 2222, which have mutually different sectional areas.

In the analysis cell 22 of the analysis bypass, each aspect of the above-described analysis cell can be adopted as a preferred example.

<Analysis Method>

A third aspect of this embodiment is an analysis method.

The analysis method according to this embodiment is an analysis method in which light is radiated on the liquid sample to analyze the sample. The analysis method includes (1) a step of flowing the liquid sample accommodated in a container to the analysis cell 22 connected to the container, and (2) a step of radiating light to the sample present within the analysis cell 22 to analyze the sample.

The analysis cell 22 includes a supply port 224 where the sample is supplied from the first flow path 32, a measurement part 222 where the light radiated from the light source part 24 passes through the sample, and a discharge port 226 where the sample is discharged from the measurement part 222 to the second flow path 34. Further, the measurement part 222 includes a first measurement portion 2221 and a second measurement portion 2222 which has the sectional area different from the sectional area of the first measurement portion 2221.

Preferably, the analysis method according to this embodiment is to radiate light on the sample present in the first measurement portion 2221, to control the radiation conditions (for example, the radiation position, the radiation strength, and the radiation time) of the light which is radiated on the sample present in the second measurement portion 2222 based on the analysis result obtained in the first measurement portion 2221, and to radiate light on the sample present in the second measurement portion 2222.

As the analysis method according to this embodiment, the first measurement portion 2221 and the second measurement portion 2222 have the portions in which the optical path lengths of the light radiated from the light source part 24 are equal to each other and the portions in which the optical path lengths of the light radiated from the light source part 24 are different from each other. Preferably, the component concentration of the sample is measured in the portions where the optical path lengths of the light are equal, and the scatterer concentration of the sample is measured in the portions where the optical path lengths of the light are different.

Another preferred example of an analysis method according to this embodiment is exemplified by a method of performing steps by using the above-described analysis system. Unless otherwise noted, the description given about the analysis system can be applied to the analysis method.

Figure 10:
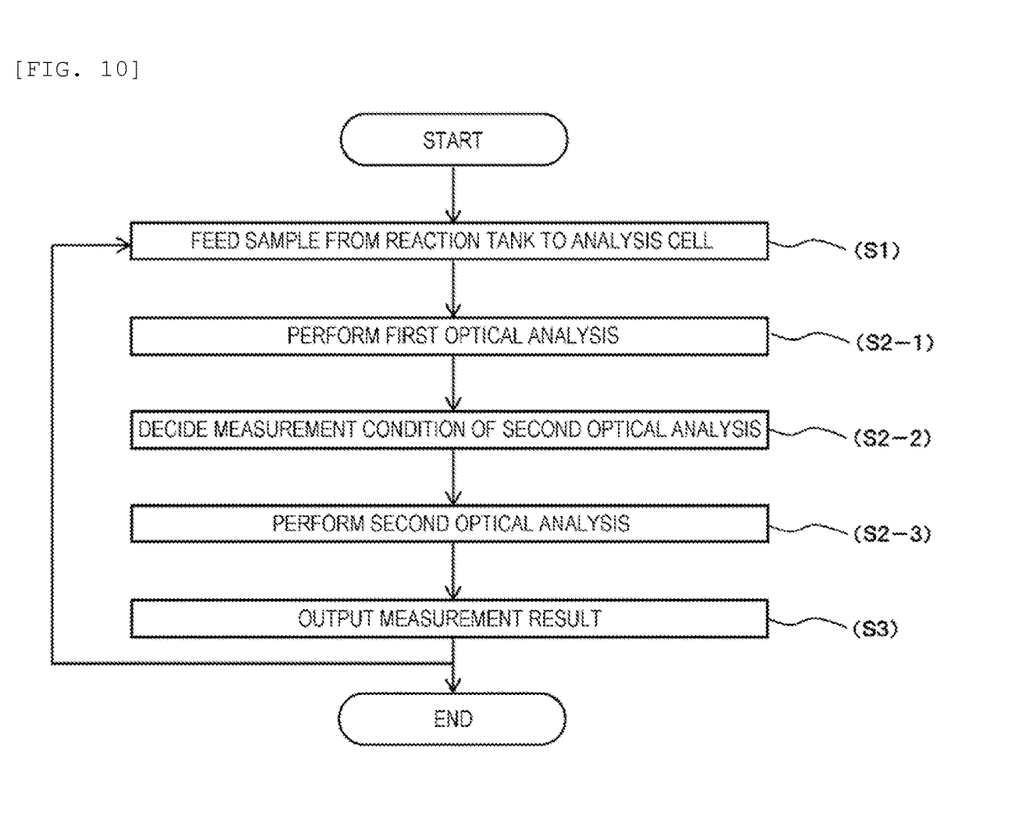
FIG. 10 is a flowchart illustrating one example of the analysis method according to this embodiment.

FIG. 10 is a flowchart illustrating one example of the analysis method according to this embodiment. The steps are performed as follows.

(S1) Feed a sample from the reaction tank 12 to the analysis cell 22:

The pump 4 feeds the sample in the reaction tank 12 to the analysis part 2.

(S2-1) First optical analysis (the optical analysis of the sample by the first measurement portion 2221):

The first light source part 241 radiates light on the sample, and the first light receiving part 261 receives the transmitted light or the scattered light thereof to extract a signal.

(S2-2) Decide the measurement condition of the second optical analysis:

The control part selects the measurement condition proper for the second optical analysis based on the signal extracted in the first measurement portion 2221, and issues a command to move the second light source part 242 to the position change mechanism.

(S2-3) Second optical analysis (the optical analysis of the sample by the second measurement portion 2222):

The second light source part 242 radiates light on the sample, and the second light receiving part 262 receives the transmitted light or the scattered light thereof to extract a signal.

(S3) Output the measurement result:

An interpretation part interprets the signals of the first measurement portion 2221 and the second measurement portion 2222 and outputs a measurement result. Then, again, the process is returned back to (S1), the analysis is performed regularly or continuously, and the reaction is monitored.

For example, a program for functioning as the above-described steps in a computer can be used as an aspect of executing the analysis method described above. A computer-readable recording medium which records the program for executing the above-described steps in the computer can be used.

The above-described steps can be executed by using a control device. For example, a terminal such as a personal computer can be used as the control device. Although not illustrated, the terminal can be provided with an interface or the like for communicating with a CPU (Central Processing Unit), a storage device, a main memory, and the like. Various functions of the control device can be stored in the storage device as an application program and the like. The CPU reads out the application program from the storage device to store in the main memory, and executes to realize the various functions.

A function of controlling the analysis condition of the optical measurement and executing a series of the analysis based on the control can be installed by the application program, for example. Further, the control device may be configured to issue the command to each of the reaction part 1 performing the reaction of the sample, the analysis part 2, the pump 4 feeding the sample, the position change mechanism, and the interpretation part. Further, the control device may be separately operated by a user.

While the invention made by the present inventors has been concretely described above based on the embodiments, it is needless to say that this embodiment is not limited to the above-described embodiments and various modifications can be made within the scope of the invention.

REFERENCE SIGNS LIST

1: reaction part
2: analysis part
3: flow path tube
4: pump
12: reaction tank
14: inlet port
16: outlet port
22, 22a, 22b, 22c: analysis cell
222: measurement part
2221: first measurement portion
2222: second measurement portion
2223: third measurement portion
2224: fourth measurement portion
2225: fifth measurement portion
224: supply port
226: discharge port
24: light source part
241: first light source part
242: second light source part
26: light receiving part
261: first light receiving part
262: second light receiving part
32: first flow path
34: second flow path
A: analysis system

The invention claimed is:

1. An analysis system in which light is radiated on a liquid sample to analyze the sample, the system comprising:
a reaction part which includes a reaction tank for accommodating the sample, an inlet port for flowing the sample into the reaction tank, and an outlet port for flowing out the sample from the reaction tank;
an analysis part which includes an analysis cell for analyzing the sample, at least one light source part for radiating light on the analysis cell, and at least one detector for receiving transmitted light or scattered light of the sample; and
a flow path tube which includes a first flow path for feeding the sample from the outlet port of the reaction tank to the analysis cell, and a second flow path for feeding the sample from the analysis cell to the inlet port of the reaction tank, wherein
the analysis cell includes a measurement part where the light from the light source part is radiated on the sample, a supply port where the sample is supplied from the first flow path to the measurement part, and a discharge port where the sample is discharged from the measurement part to the second flow path, and
the measurement part includes a first measurement portion and the second measurement portion, which mutually have different sectional areas.

2. The analysis system according to claim 1, wherein
the light source part includes
a first light source part which radiates first light on the sample of the first measurement portion, and
a second light source part which radiates second light on the sample of the second measurement portion, and
the detector includes
a first detector which receives the transmitted light or the scattered light of the sample of the first measurement portion, and
a second detector which receives the transmitted light or the scattered light of the sample of the second measurement portion.

3. The analysis system according to claim 2, wherein
the analysis part further includes at least one processor configured to execute a program stored in a memory to control a light radiation condition of the second light source part based on the analysis result obtained in the first detector.

4. The analysis system according to claim 1, wherein
a component concentration of the sample is measured in the first measurement portion, and a scatterer concentration of the sample is measured in the second measurement portion.

5. The analysis system according to claim 1, wherein the first measurement portion and the second measurement portion have portions in which optical path lengths of the light radiated from the light source part are equal to each other, and portions in which optical path lengths of the light radiated from the light source part are different from each other.

6. The analysis system according to claim 5, wherein
a component concentration of the sample is measured in the portions where the optical path lengths of the light are equal, and
a scatterer concentration of the sample is measured in the portions where the optical path lengths of the light are different.

7. The analysis system according to claim 1, wherein the light source part has an optical path of the light radiated on the first measurement portion and an optical path of the light radiated on the second measurement portion to be arranged in a twisted position.

8. The analysis system according to claim 1, wherein a sectional area of the light radiated from the light source part is smaller than any one of a surface area of a radiation region of the first measurement portion and a surface area of a radiation region of the second measurement portion.

9. An analysis bypass comprising:
an analysis part which includes an analysis cell for analyzing a liquid sample; and
a flow path tube which includes a first flow path for feeding the sample to the analysis cell and a second flow path for feeding the sample to an outside from the analysis cell, wherein
the analysis cell has a first measurement portion and a second measurement portion, which have mutually different sectional areas,
when, in the analysis cell, a flow direction of the sample is set as an X-axis direction, a direction substantially perpendicular to the flow direction is set as a Y-axis direction, and a direction perpendicular to a plane including the X-axis direction and the Y-axis direction is set as a Z-axis direction,
the analysis cell has at least the first measurement portion, the second measurement portion, a third measurement portion, a fourth measurement portion, and a fifth measurement portion along the X-axis direction in this order,
sectional areas of the first to third measurement portions are different from each other,
sectional areas of the third to fifth measurement portions are different from each other,
all lengths of the first to fifth measurement portions in the Z-axis direction are almost equal, and
lengths in the Y-axis direction
satisfy a relation of a length of the third measurement portion in the Y-axis direction>a length of the second measurement portion in the Y-axis direction>a length of the first measurement portion in the Y-axis direction, and
satisfy a relation of the length of the third measurement portion in the Y-axis direction>a length of the fourth measurement portion in the Y-axis direction>a length of the fifth measurement portion in the Y-axis direction.

10. The analysis bypass according to claim 9, wherein the analysis cell includes the first measurement portion and the second measurement portion adjacent to each other, and has a substantially truncated cone shape.

11. An analysis method in which light is radiated on a liquid sample to analyze the sample, the method comprising:
(1) a step of flowing the liquid sample accommodated in a container to an analysis cell connected to the container; and
(2) a step of radiating light on the sample present in the analysis cell to analyze the sample, wherein
the analysis cell includes a supply port where the sample is supplied from a first flow path, a measurement part where light radiated from a light source part passes through the sample, and a discharge port where the sample is discharged from the measurement part to a second flow path, and
the measurement part includes a first measurement portion and a second measurement portion which has a sectional area different from the sectional area of the first measurement portion,
light is radiated on the sample present in the first measurement portion, and
a radiation condition of light which is radiated on the sample present in the second measurement portion is controlled based on the analysis result obtained in the first measurement portion, and the light is radiated on the sample present in the second measurement portion.

* * * * *